US012779766B2

(12) United States Patent
Wang et al.

(10) Patent No.: US 12,779,766 B2
(45) Date of Patent: Nov. 3, 2026

(54) METHOD FOR MANUFACTURING A MASKING FILM AND MASKING FILM MANUFACTURED THEREBY

(71) Applicant: TREDEGAR SURFACE PROTECTION, LLC, N. Chesterfield, VA (US)

(72) Inventors: Guangkai Wang, Guangzhou (CN); Jinwang Xu, Guangzhou (CN); Zehua Ye, Guangzhou (CN); Chao Wang, Guangzhou (CN)

(73) Assignee: TREDEGAR SURFACE PROTECTION, LLC, N. Chesterfield, VA (US)

( * ) Notice: Subject to any disclaimer, the term of this patent is extended or adjusted under 35 U.S.C. 154(b) by 196 days.

(21) Appl. No.: 18/286,689

(22) PCT Filed: Feb. 17, 2023

(86) PCT No.: PCT/CN2023/076692

§ 371 (c)(1),
(2) Date: Oct. 12, 2023

(87) PCT Pub. No.: WO2024/168790

PCT Pub. Date: Aug. 22, 2024

(65) Prior Publication Data

US 2025/0092279 A1 Mar. 20, 2025

(51) Int. Cl.
*B29C 59/00* (2006.01)
*B29C 37/00* (2006.01)
(Continued)

(52) U.S. Cl.
CPC .......... *B29C 59/00* (2013.01); *B29C 37/0053* (2013.01); *B29C 48/914* (2019.02);
(Continued)

(58) Field of Classification Search
CPC ... B29C 48/88; B29C 48/911; B29C 48/9135; B29C 59/00; B29C 59/002; B29C 59/02;
(Continued)

(56) References Cited

U.S. PATENT DOCUMENTS 3,576,929 A * 4/1971 Turner .................. B29C 48/912
264/237
4,148,851 A 4/1979 Tani et al.
(Continued)

FOREIGN PATENT DOCUMENTS

KR 20000064434 A 11/2000
WO 2007148849 A1 12/2007
WO 2014038769 A1 3/2014

OTHER PUBLICATIONS

International Search Report and Written Opinion dated Aug. 18, 2023, for International Patent Application No. PCT/CN2023/076692.

(Continued)

*Primary Examiner* — Jeffrey M Wollschlager
(74) *Attorney, Agent, or Firm* — KARCESKI IP LAW, PLLC

(57) ABSTRACT

A method for manufacturing a masking film includes forming a molten polymer web that includes at least one polymer, spraying a fluid on one side of the molten polymer web to rapidly cool a random pattern of locations on the one side of the molten polymer web, and cooling the molten polymer web to form the masking film. The masking film includes a plurality of protrusions on one side thereof that correspond to the random pattern of locations on the one side of the molten polymer web contacted by the fluid.

11 Claims, 5 Drawing Sheets

(51) Int. Cl.

| | |
|---|---|
| ***B29C 48/88*** | (2019.01) |
| ***B29C 59/02*** | (2006.01) |
| ***B29K 23/00*** | (2006.01) |
| ***B29L 7/00*** | (2006.01) |
| ***B32B 3/30*** | (2006.01) |
| ***B32B 27/08*** | (2006.01) |
| ***B32B 27/32*** | (2006.01) |
| ***C08J 5/18*** | (2006.01) |
| ***C09D 123/06*** | (2006.01) |

(52) U.S. Cl.
CPC .......... *B29C 59/005* (2013.01); *B29C 59/022* (2013.01); *B32B 3/30* (2013.01); *B32B 27/08* (2013.01); *B32B 27/32* (2013.01); *C08J 5/18* (2013.01); *C09D 123/06* (2013.01); *B29C 2059/023* (2013.01); *B29K 2023/0633* (2013.01); *B29K 2995/0097* (2013.01); *B29L 2007/008* (2013.01); *B32B 2250/03* (2013.01); *B32B 2250/242* (2013.01); *B32B 2250/40* (2013.01)

(58) Field of Classification Search
CPC ............ B29C 71/0009; B29C 37/0053; B29C 48/914; B29C 59/005; B29C 59/022; B29C 2059/023; B29C 43/44; B29C 43/22; B29C 43/222; B32B 3/30; B32B 27/08; B32B 27/32; B32B 2250/03; B32B 2250/242; B32B 2250/40; C08J 5/18; C08J 7/12; C08J 2323/06; C09D 123/06; B29K 2023/0633; B29K 2995/0097; B29L 2007/008
See application file for complete search history.

(56) References Cited

U.S. PATENT DOCUMENTS

| | | | | |
|---|---|---|---|---|
| 4,486,377 | A | 12/1984 | Lucchesi et al. | |
| 4,885,201 | A * | 12/1989 | Brandt | B29C 65/028 428/206 |
| 4,895,760 | A * | 1/1990 | Barger | B29C 63/0017 428/458 |
| 5,332,624 | A | 7/1994 | Nichols | |
| 6,040,046 | A * | 3/2000 | Ghiam | B32B 38/06 428/343 |
| 6,309,200 | B1 * | 10/2001 | Teutsch | B29C 59/00 425/325 |
| 2004/0265540 | A1 * | 12/2004 | Balakoff | B32B 25/16 428/156 |
| 2009/0315017 | A1 * | 12/2009 | Song | H10D 30/47 438/149 |
| 2011/0282288 | A1 * | 11/2011 | Drewes, Jr. | B32B 27/32 156/143 |
| 2012/0141732 | A1 * | 6/2012 | Patel | B65G 49/069 428/141 |
| 2015/0224740 | A1 | 8/2015 | Kim et al. | |
| 2017/0008211 | A1 * | 1/2017 | Middlesworth | B29C 48/914 |
| 2022/0371914 | A1 * | 11/2022 | Keis | B01D 61/52 |

OTHER PUBLICATIONS

Taiwanese Office Action dated Mar. 18, 2025, for Taiwanese Patent Application No. 112136383.

Korean Office Action dated Aug. 7, 2025, for Korean Patent Application No. 10-2023-7033979.

* cited by examiner

METHOD FOR MANUFACTURING A MASKING FILM AND MASKING FILM MANUFACTURED THEREBY

CROSS-REFERENCE TO RELATED APPLICATION(S)

This is a National Stage Entry into the United States Patent and Trademark Office from International Patent Application No. PCT/CN2023/076692, filed on Feb. 17, 2023, the entire contents of which are incorporated herein by reference.

FIELD OF THE INVENTION

The present invention is generally related to a method for manufacturing a masking film for protecting surfaces, and a masking film manufactured by such a method.

BACKGROUND OF THE INVENTION

Masking films, also known as surface protection films, are typically used to provide a physical barrier to prevent damage, contamination, scratching, scuffing, and/or other marring of a substrate to which they are adhered. Masking films may be applied to delicate, sensitive substrates, such as plastic optical films and thin glass plates that are used as components of electronic displays, to protect the substrates through one or more subsequent processing steps during manufacturing, as well as during shipping, and/or storage prior to use of the substrate.

Commonly used masking films achieve adhesion to substrates by van der Walls forces, which requires the masking film and substrate to each have at least one very flat and uniform surface so the masking film can intimately contact the substrate. The amount of adhesion can be increased or decreased by softening or hardening the composition, or by changing the surface characteristics, such as roughness, of the adhesive surface of the masking film. Too much adhesion may make it difficult to remove the masking film from the substrate without damaging the substrate, and too little adhesion may result in the masking film separating prematurely from the substrate such that the substrate is no longer protected.

In some applications where substrates are stacked for storage and/or transportation, it may be desirable to use materials that do not adhere to the surfaces of the substrates, but instead are interleaved with the substrates to provide a physical separation. In such applications, paper or other materials may be used to interleave with the substrates to protect against damage. However, such materials may leave unwanted fibers or residue on the substrates upon removal and may create small imperfections, such as microscratches, in the substrates.

To prevent such damage to the substrates, masking films may be adhered to each side of the substrate, but then the masking films that contact each other may continue to adhere to each other when the substrates are unstacked and as a result, cause damage to the substrates. In some instances, a paper interleaf may be placed between two masking films to prevent such sticking, thereby adding cost. Attempts have been made to create a masking film that has a smooth surface on one side to adhere to the substrate, and a rougher, matte surface to contact a masking film attached to the adjacent substrate in the stack.

For example, International Publication No. WO 2007/148849 discloses a glass protective film that includes a slightly adhesive surface and a rough microbead surface that is studded with a large number of microbeads, and International Publication No. WO 2014/038769 discloses a glass protective film that includes a weak adhesive surface and a rough bead surface. Both publications describe the beads as being embedded into one side of the film while the film is molded and cured from a molten, slightly adhesive base material. Because the beads are not integrally formed from the base material, the beads may separate from the film during use, which ultimately may lead to damage of the substrates.

It is desirable to have a masking film with a matte or rough surface that does not include particles that may separate from the base film but still provides the function of protecting the substrate and being separable from the masking film protecting the next substrate in a stack of substrates.

SUMMARY OF THE INVENTION

According to an aspect of the present invention, there is provided a method for manufacturing a masking film. The method includes forming a molten polymer web that includes at least one polymer, spraying a fluid on one side of the molten polymer web to rapidly cool a random pattern of locations on the one side of the molten polymer web, and cooling the molten polymer web to form the masking film. The masking film includes a plurality of protrusions on one side thereof corresponding to the random pattern of locations on the one side of the molten polymer web contacted by the fluid.

In an embodiment, the fluid is selected from the group consisting of: water, liquid nitrogen, and dry ice. In an embodiment, the fluid is water. In an embodiment, the water is deionized water.

In an embodiment, the fluid is sprayed at a pressure of between 1.5 bars and 2.5 bars.

In an embodiment, the at least one polymer is a polyolefin. In an embodiment, the polyolefin is selected from the group consisting of low density polyethylene, high density polyethylene, and polypropylene. In an embodiment, the polyolefin is low density polyethylene.

In an embodiment, during the cooling of the molten polymer web to form the masking film, a second side of the molten polymer web, opposite the one side of the molten polymer web contacted by the fluid, contacts a cooling roller.

In an embodiment, the method includes drying the masking film.

According to an aspect of the inventions, there is provided a masking film manufactured according to any of embodiments of the method of manufacturing disclosed herein.

In an embodiment, the masking film has a nominal film thickness of between 20 microns and 50 microns.

In an embodiment, the protrusions have a height of between 100 microns and 200 microns.

These and other aspects, features, and characteristics of the present invention, as well as the methods of operation and functions of the related elements of structure and the combination of parts and economies of manufacture, will become more apparent upon consideration of the following description and the appended claims with reference to the accompanying drawings, all of which form a part of this specification. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

BRIEF DESCRIPTION OF THE DRAWINGS

The components of the following figures are illustrated to emphasize the general principles of the present disclosure and are not drawn to scale. Reference characters designating corresponding components are repeated as necessary throughout the figures for the sake of consistency and clarity.

DETAILED DESCRIPTION OF EMBODIMENT(S) OF THE INVENTION

Figure 1:
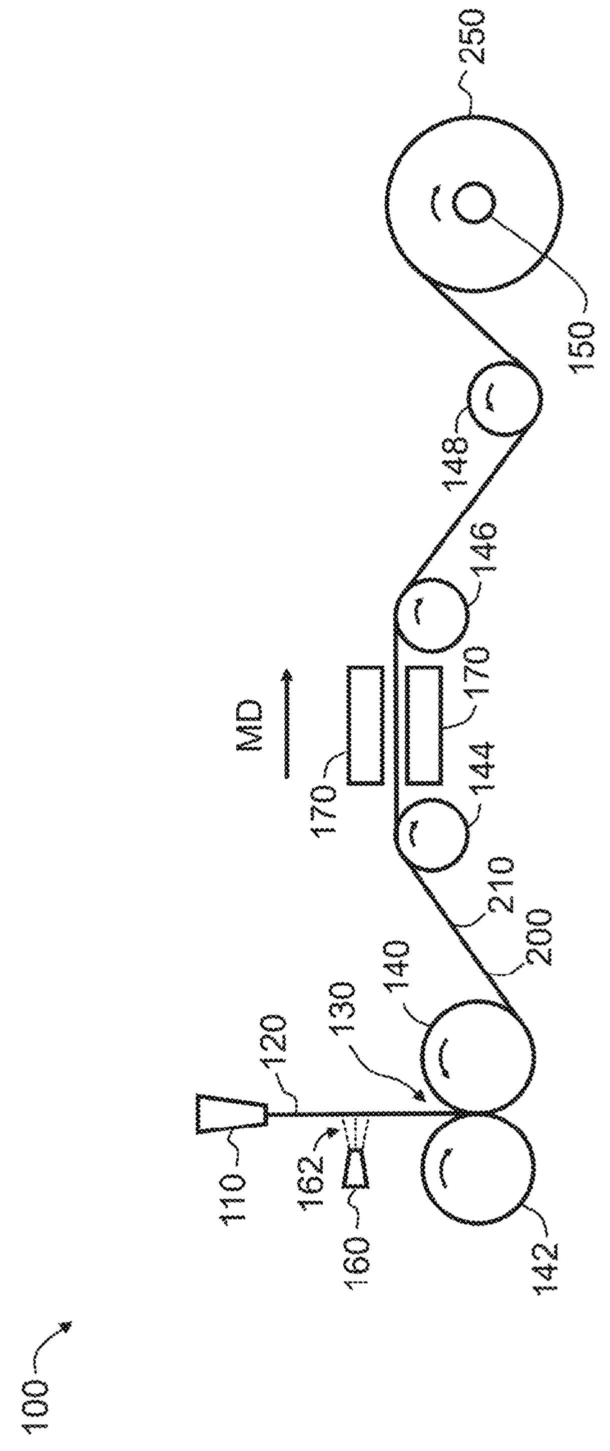
FIG. 1 schematically illustrates an embodiment of an apparatus for manufacturing a masking film according to embodiments of the invention.

FIG. 1 illustrates an apparatus 100 for manufacturing a masking film according to embodiments of the invention. As illustrated, the apparatus 100 includes an extrusion die 110 that is located at the end of at least one extruder (not shown) and configured to form a polymer web 120, also known as an extrudate or melt curtain.

The material used to form the polymer web 120 may include a polyolefin, such as polyethylene (PE), such as high density polyethylene (HDPE), low density polyethylene (LDPE), or linear low density polyethylene (LLDPE), or polypropylene (PP), and/or blends thereof. One or more additives, such as an antioxidant, may be included with the material used to form the polymer web 120.

In the embodiment illustrated in FIG. 1, the polymer web 120 exits the extrusion die 110 and begins to cool and crystalize before entering a nip 130 formed between a cooling roller 140 that rotates around a first axis, and a process roller 142 that rotates around a second axis that is parallel to the first axis. A nip pressure created in the nip 130 may be adjusted by known means. The cooling roller 140 may have a smooth surface or an embossed surface configured to provide texture to one side of the polymer web 120, and the process roller 142 may have a smooth surface or an embossed surface configured to provide a texture to an opposite side of the polymer web 120. The cooling roller 140 continues to cool the polymer web 120 as it is transformed into a solid masking film 200 so that the film 200 may be pulled off of the cooling roller 140 by another roller 144 and ultimately conveyed in a machine direction MD to a winder 150 and wound into a roll 250. Additional rollers, such as rollers 146, 148 depicted in FIG. 1, may be used to convey the film 200 from the cooling roller 140 to the winder 150. The illustrated embodiment is not intended to be limiting in any way and more or less rollers may be used to convey the film 200 to the winder 150.

As illustrated in FIG. 1, a nozzle 160 is positioned relative to the polymer web 120 so that the nozzle 160 may apply a fluid 162 in the form of a spray (i.e., spray media) to one side of the polymer web 120. The fluid 162 may be in the form of water, such as deionized water, which may be at any temperature, dry ice (i.e., solid carbon dioxide), liquid nitrogen, or any other suitable fluid that may cool the polymer web 120 in random locations as the polymer web 120 travels between the die 110 and the nip 130.

In an embodiment, a dryer 170 may optionally be positioned downstream from the cooling roller 140 in the machine direction MD and configured to dry the film 200 and allow any excess or residual moisture to evaporate, if needed, prior to being wound on the winder 150 into the roll 250.

Figures 2, 2A:
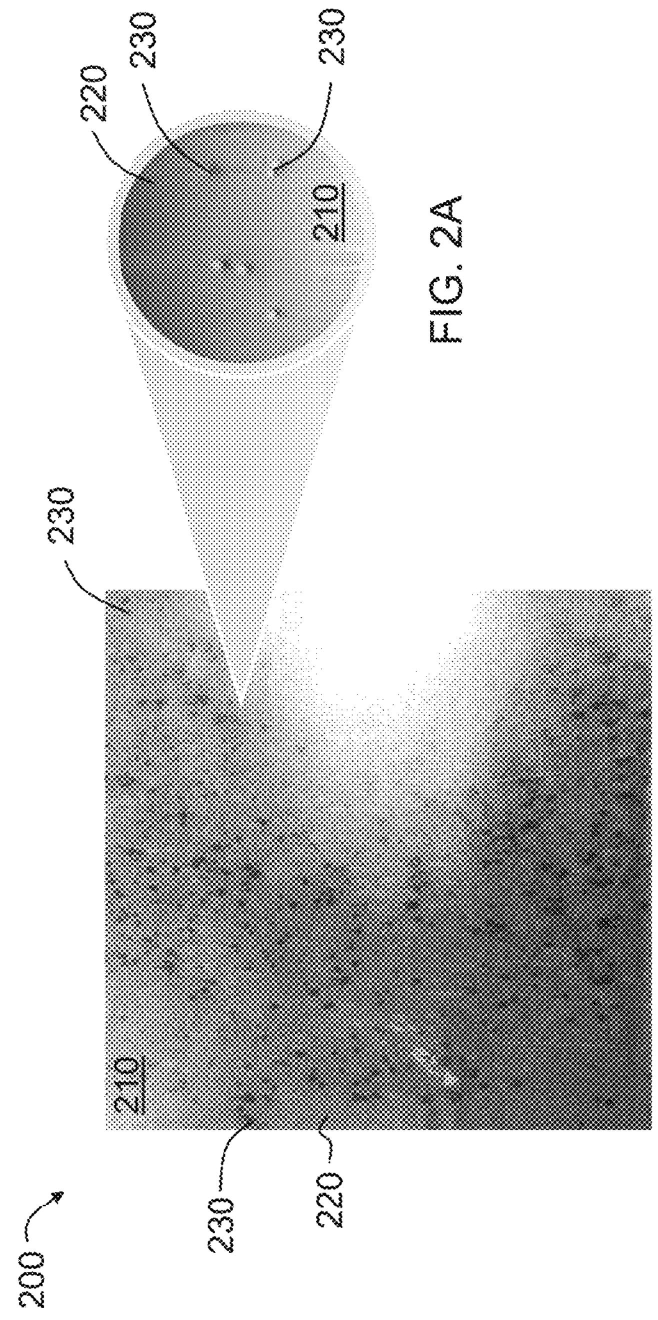
FIG. 2 is a photograph of one side of the masking film manufactured on an embodiment the apparatus schematically illustrated in FIG. 1.
FIG. 2A is a photograph of a zoomed in portion of the masking film illustrated in FIG. 2.
Figure 3:
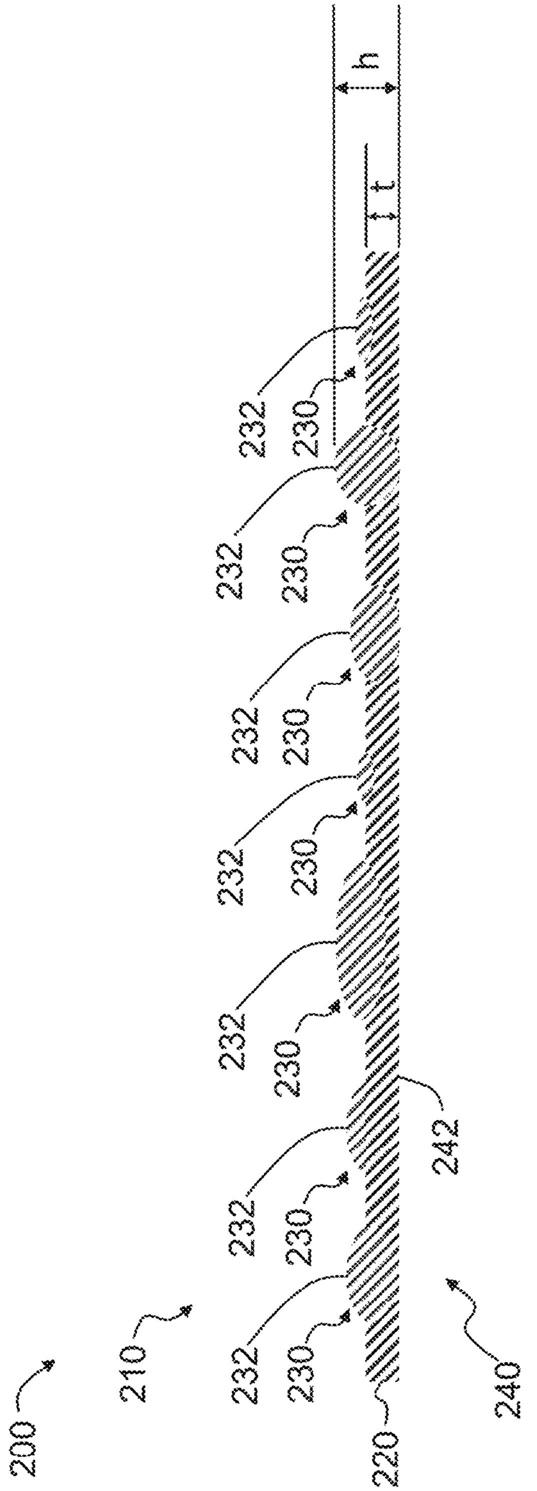
FIG. 3 is a schematic cross-sectional view of the masking film illustrated in FIG. 2.

FIGS. 2 and 2A are photographs of a first side 210 of the film 200, and FIG. 3 is a schematic illustration of a cross-section of the film 200. It has been found that applying the fluid 162 to one side of the polymer web 120 causes rapid cooling and crystallization of the random spots that the fluid 162 contacts, and as a result protrusions 230 are formed at such random spots, thereby providing a matte surface on the first side 210 of the film 200. As illustrated, the film 200 includes a base portion 220 that has a nominal thickness (t), and a plurality of protrusions 230 that extend from the base portion 220 on the first side 210 of the film 200. A second side 240 of the film 200 is opposite the first side 210 and has a relatively smooth surface 242. The relatively smooth surface 242 of the second side 240 is configured to adhere to a smooth surface of a substrate in the manner described above with respect to adhesion via van der Waals forces. The plurality of protrusions 230 are randomly located on the first side 210 of the film 200 and have varying sizes, shapes and heights. The height (h) of a single protrusion 230 is defined as the distance between the smooth surface 242 of the second side 240 of the film 200 and a peak 232 of the protrusion 230, as illustrated in FIG. 3.

Figure 5:
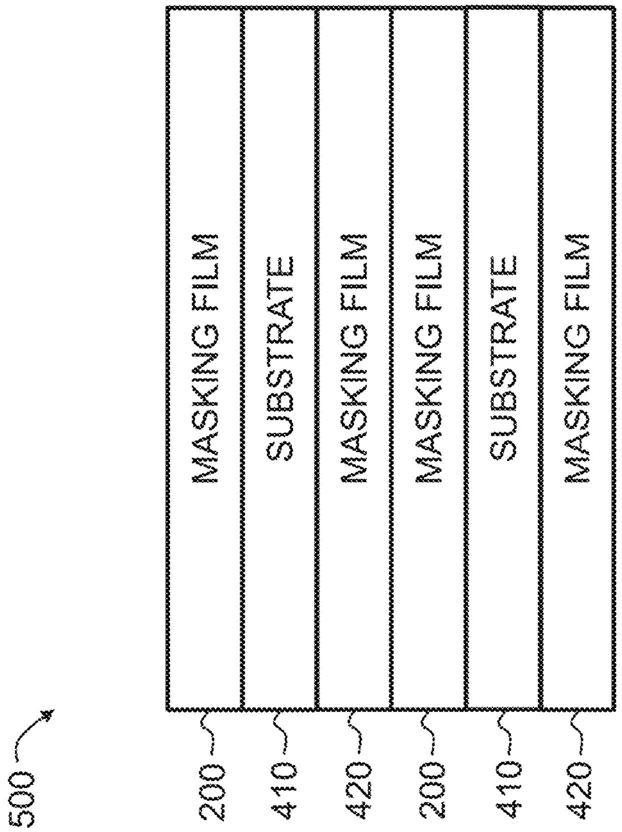
FIG. 5 is a schematic illustration of two of the protected substrates illustrated in FIG. 4 in a stacked configuration.
Figure 4:
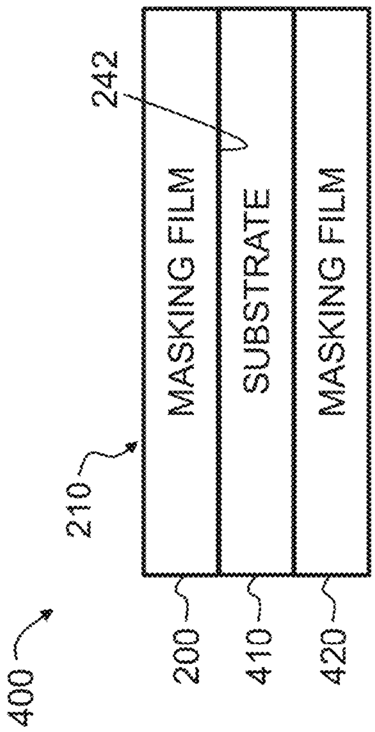
FIG. 4 is a schematic illustration of a protected substrate that has the masking film illustrated in FIGS. 2 and 3 adhered to one side of the substrate and a masking film of the prior art adhered to the opposite side of the substrate.

FIG. 4 schematically illustrates a protected substrate 400 that includes a substrate 410, which may, for example, be a thin piece of glass, and the masking film 200 of the present invention attached to one side of the substrate 410. As illustrated, the smooth surface 242 of the masking film 200 is attached to the substrate 410. Another masking film 420, which may be a masking film known in the prior art that has two relatively smooth surfaces, is attached to the opposite side of the substrate 410. FIG. 5 schematically illustrates two protected substrates 400 in a stack 500. As illustrated, the first side 210 of the masking film 200 of the present invention is in contact with the masking film 420, which has a relatively smooth outer surface.

EXAMPLES

The apparatus 100 schematically illustrated in FIG. 1, equipped with three extruders upstream of the die 110, was used to manufacture a series of films, described below, having a target nominal thickness of 25 μm, with a core layer having a target thickness of 21 μm and outside layers each having a target thickness of 2 μm.

Example 1: Low density polyethylene (LDPE) was used in each of the three layers. The nozzle 160 was positioned 300 mm from the polymer web 120, and the fluid 162 was deionized water that was sprayed onto the polymer web at a spray pressure of 2.5 bars.

Example 2: Low density polyethylene (LDPE) was used in each of the outer layers, and high density polyethylene (HDPE) was used in the core layer. The nozzle 160 was positioned 250 mm from the polymer web 120, and the fluid 162 was deionized water that was sprayed onto the polymer web at a spray pressure of 2.5 bars.

Example 3: Low density polyethylene (LDPE) was used in each of the three layers. The nozzle 160 was positioned 250 mm from the polymer web 120, and the fluid 162 was deionized water that was sprayed onto the polymer web at a spray pressure of 2 bars.

Example 4: Low density polyethylene (LDPE) was used in each of the outer layers, and high density polyethylene (HDPE) was used in the core layer. The nozzle 160 was positioned 200 mm from the polymer web 120, and the fluid 162 was deionized water that was sprayed onto the polymer web at a spray pressure of 2 bars.

Example 5: Low density polyethylene (LDPE) was used in each of the three layers. The nozzle 160 was positioned 200 mm from the polymer web 120, and the fluid 162 was deionized water that was sprayed onto the polymer web at a spray pressure of 1.5 bars.

Example 6: Low density polyethylene (LDPE) was used in each of the three layers. The nozzle 160 was positioned 150 mm from the polymer web 120, and the fluid 162 was deionized water that was sprayed onto the polymer web at a spray pressure of 1.5 bars.

Comparative Example A: Low density polyethylene (LDPE) was used in each of the three layers. No fluid was sprayed onto the polymer web 120 so that no protrusions were formed and the resulting film had relatively smooth outer surfaces on both sides.

The mean height of the protrusions for each of Examples 1-6 was measured and the results are listed in Table I below.

In addition, each of the samples was laminated to a piece of 5"×5" glass, with the side 210 having the protrusions 230 facing outward, and a prior art masking film having relatively smooth surfaces was laminated to another piece of 5"×5" glass. The piece of glass having the prior art masking film was placed on the piece of glass having a sample such that the prior art masking film was in contact with the sample. A suction cup was attached to the piece of glass having the prior art masking film and lifted upward to see how long it would take to separate the two pieces of protected glass. The results are listed in Table I as the mean release time.

TABLE I

Characteristics of Masking Films

| Sample | Mean Protrusion Height microns | Mean Release Time (sec.) |
|---|---|---|
| Example 1 | 100 | 0.5 |
| Example 2 | 110 | 0.45 |
| Example 3 | 139 | 0.3 |
| Example 4 | 138 | 0.32 |
| Example 5 | 122 | 0.4 |
| Example 6 | 124 | 0.38 |
| Comparative Example A | NA | 3 |

Figure 6:
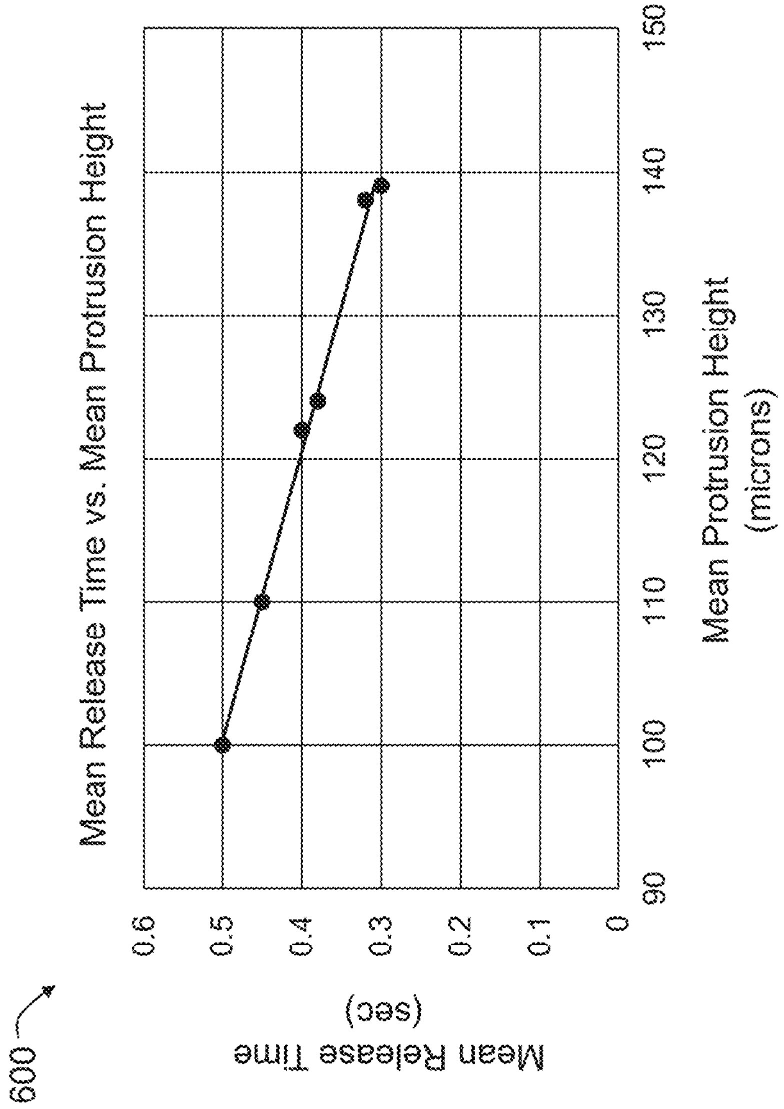
FIG. 6 is a graph illustrating mean release time as a function of mean protrusion height of masking films according to embodiments of the invention.

FIG. 6 illustrates a graph 600 of the mean release time of Examples 1-6 as a function of mean protrusion height. As illustrated, as the protrusion height increases, the release time decreases in a substantially linear manner over the range tested.

Because the protrusions 230 are formed from the polymer web and are integral parts of the masking film 200, the protrusions should not separate from the masking film 200 during use, which significantly reduces the chance of potential contamination of the substrates 410 that the masking film 200 protects.

The embodiments described herein represent a number of possible implementations and examples and are not intended to necessarily limit the present disclosure to any specific embodiments. Instead, various modifications can be made to these embodiments as would be understood by one of ordinary skill in the art. Any such modifications are intended to be included within the spirit and scope of the present disclosure and protected by the following claims.

What is claimed is:

1. A method for manufacturing a masking film, the method comprising:

forming a molten polymer web comprising at least one polymer, wherein the molten polymer web comprises a first side and a second side;

spraying a fluid on the first side of the molten polymer web to rapidly cool a random pattern of locations on the first side of the molten polymer web; and after spraying the fluid on the first side of the molten polymer web, cooling the molten polymer web between a cooling roller and a process roller to form the masking film, wherein the masking film has a nominal film thickness of between 20 microns and 50 microns, wherein the masking film has a first side and a second side corresponding to the first side and the second side of the molten polymer web, wherein the masking film comprises a plurality of protrusions on the first side thereof corresponding to the random pattern of locations on the first side of the molten polymer web contacted by the fluid, wherein the protrusions have a mean height of between 100 microns and 200 microns, and wherein the second side of the masking film is smooth.

2. The method according to claim 1, wherein the fluid is selected from the group consisting of: water, liquid nitrogen, and dry ice.

3. The method according to claim 2, wherein the fluid is water.

4. The method according to claim 3, wherein the water is deionized water.

5. The method according to claim 1, wherein the fluid is sprayed at a pressure of between 1.5 bars and 2.5 bars.

6. The method according to claim 1, wherein the at least one polymer is a polyolefin.

7. The method according to claim 6, wherein the polyolefin is selected from the group consisting of low density polyethylene, high density polyethylene, and polypropylene.

8. The method according to claim 7, wherein the polyolefin is low density polyethylene.

9. The method according to claim 1, wherein during the cooling of the molten polymer web to form the masking film, the second side of the molten polymer web, opposite the one side of the molten polymer web contacted by the fluid, contacts the cooling roller.

10. The method according to claim 1, further comprising drying the masking film.

11. The method according to claim 1, wherein the forming of the molten polymer web comprises extruding the polymer web in the form of a melt curtain via an extruder.

* * * * *